United States Patent Office 3,353,365
Patented Nov. 21, 1967

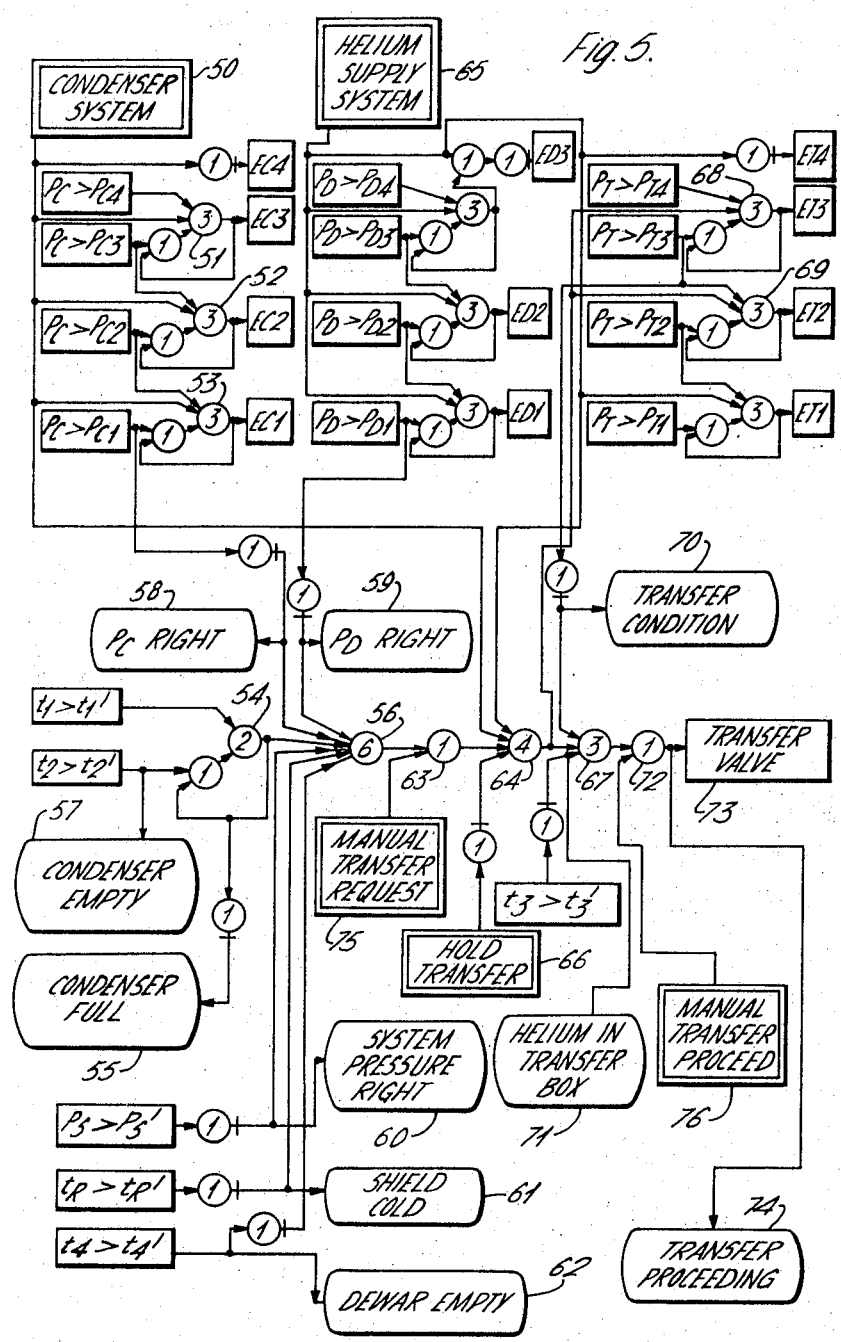

3,353,365
CRYOGENIC DEVICES
John Norman Chubb, Didcot, England, assignor to United Kingdom Atomic Energy Authority, London, England
Filed Feb. 9, 1966, Ser. No. 526,125
Claims priority, application Great Britain, Feb. 24, 1965, 8,035/65
7 Claims. (Cl. 62—55.5)

ABSTRACT OF THE DISCLOSURE

A cryogenic device comprising a vessel containing cryogenic liquid which is maintained at a desired temperature by vapour pumping. Provision is made for automatically replenishing the vessel with further cryogenic liquid as necessary, without causing any appreciable fluctuation in the temperature of the cryogenic liquid in the vessel. The device may form part of a cryopump.

This invention relates to cryogenic devices and particularly, but not exclusively, to cryopumps.

A cryopump is a form of vacuum pump which includes a cryogenically cooled surface in contact with the gas within the system to be pumped. Gas molecules striking the cooled surface lose a part of their incident energy, and if the cooled surface is maintained at a temperature sufficiently below the normal boiling point of the gas in the system, then gas phase molecules are removed from the system by condensation on the cooled surface. For effective pumping the incident molecules should preferably have a high sticking coefficient, that is to say there should be a high probability that a gas molecule striking the cooled surface will condense, and the rate of evaporation must be lower than the rate of condensation.

To maintain an optimum balance between pumping efficiency and refrigeration requirements it is desirable to keep the whole condensing surface within close temperature limits. To achieve this over an extensive cooled surface and to provide good temperature stability against fluctuating heat loads it is desirable that the surface be cooled by direct contact with a cryogenic liquid on its reverse side, rather than by contact with a gaseous refrigerant.

In a practical arrangement the cooled surface forms one wall of a vessel which contains a suitable cryogenic liquid, for example liquid helium, this wall projecting into the system to be pumped. The temperature of the cooled surface can be controlled by regulating the gas phase pressure over the cryogenic liquid. To allow operating times greater than can conveniently be achieved by storing cryogenic liquid within the vessel itself, it is necessary to replenish the cryogenic liquid from time to time.

Hitherto no satisfactory arrangement has been devised for accurately maintaining the temperature of the cooled surface whilst the cryogenic liquid is being replenished, and one object of the present invention is to provide a cryopump including such an arrangement.

According to one aspect of the present invention, a cryogenic device comprises a first vessel arranged to contain a cryogenic liquid, means to maintain the cryogenic liquid in the first vessel substantially at a desired temperature, a subsidiary vessel communicating directly with the first vessel, a connection through which cryogenic liquid is arranged to be supplied from a second vessel containing a further quantity of the same cryogenic liquid to the subsidiary vessel when the cryogenic liquid in the first vessel needs replenishing, and means to allow cryogenic liquid to pass from the subsidiary vessel into the first vessel only when the temperature of the cryogenic liquid in the subsidiary vessel is substantially equal to said desired temperature.

According to another aspect of the present invention, a cryopump comprises a surface arranged to be in contact with the gas within a system to be pumped, a first vessel arranged to contain a cryogenic liquid in good thermal contact with said surface so that the surface is maintained substantially at the temperature of the cryogenic liquid, this temperature being such that there is a net condensation of gas phase molecules from the system on to said surface, means to maintain the cryogenic liquid in the first vessel substantially at a desired temperature, a subsidiary vessel communicating directly with the first vessel, a connection through which cryogenic liquid is arranged to be supplied from a second vessel containing a further quantity of the same cryogenic liquid to the subsidiary vessel when the cryogenic liquid in the first vessel needs replenishing, and means to allow cryogenic liquid to pass from the subsidiary vessel into the first vessel only when the temperature of the cryogenic liquid in the subsidiary vessel is substantially equal to said desired temperature.

The invention may for example comprise a cryopump in which the cryogenic liquid is liquid helium and in which the gas to be evacuated from the system to be pumped is principally hydrogen. To maintain a useful vacuum in hydrogen it is desirable to work with said surface at a temperature in the range 3.1 to 3.9° K. which corresponds to the temperature obtained by boiling liquid helium under a reduced pressure in the range 210 to 580 millimetres of mercury.

A cryopump in accordance with the present invention will now be described by way of example with reference to the accompanying drawings, in which:

FIGURE 4 shows a partial section through another part of the cryopump control system, and FIGURE 5 shows the control circuit of the cryopump diagrammatically.

Figure 1:
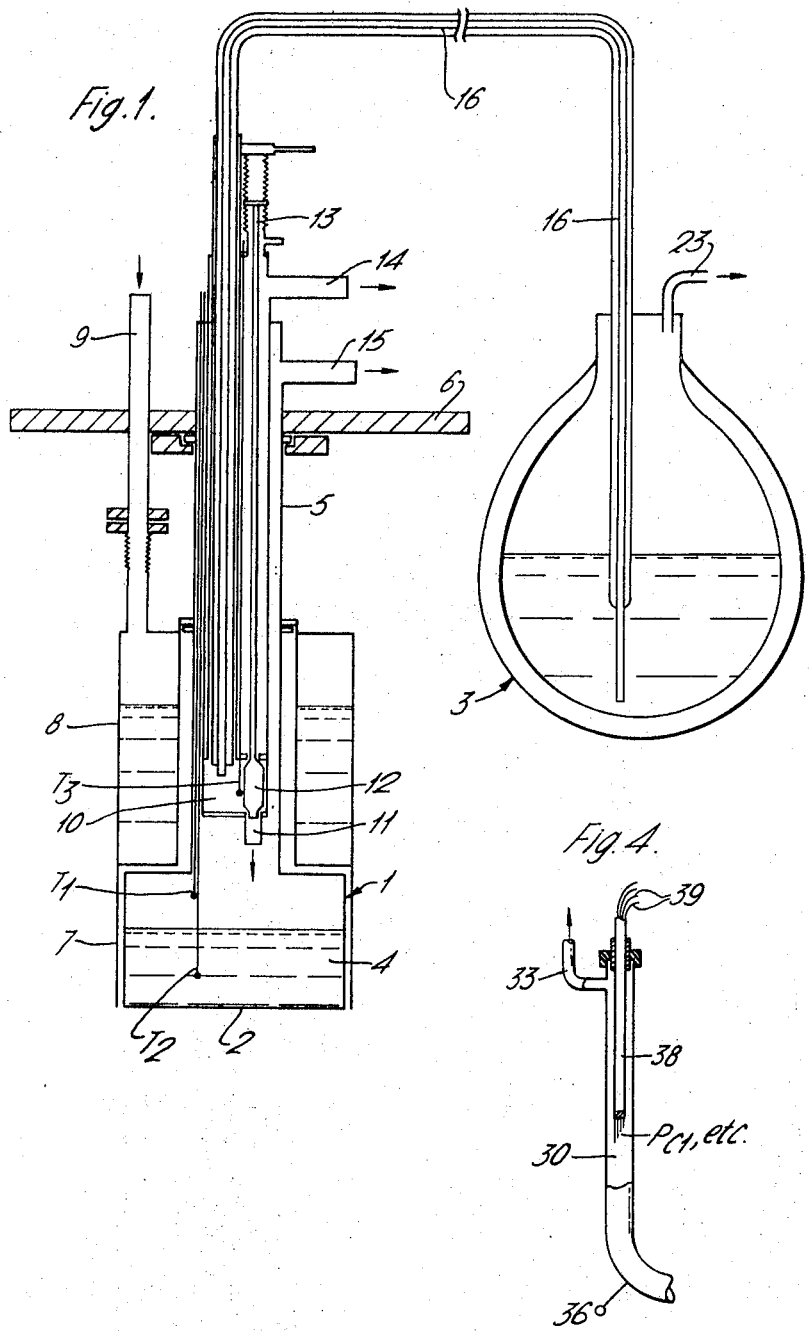
FIGURE 1 shows a section through a part of the cryopump.
Figure 2:
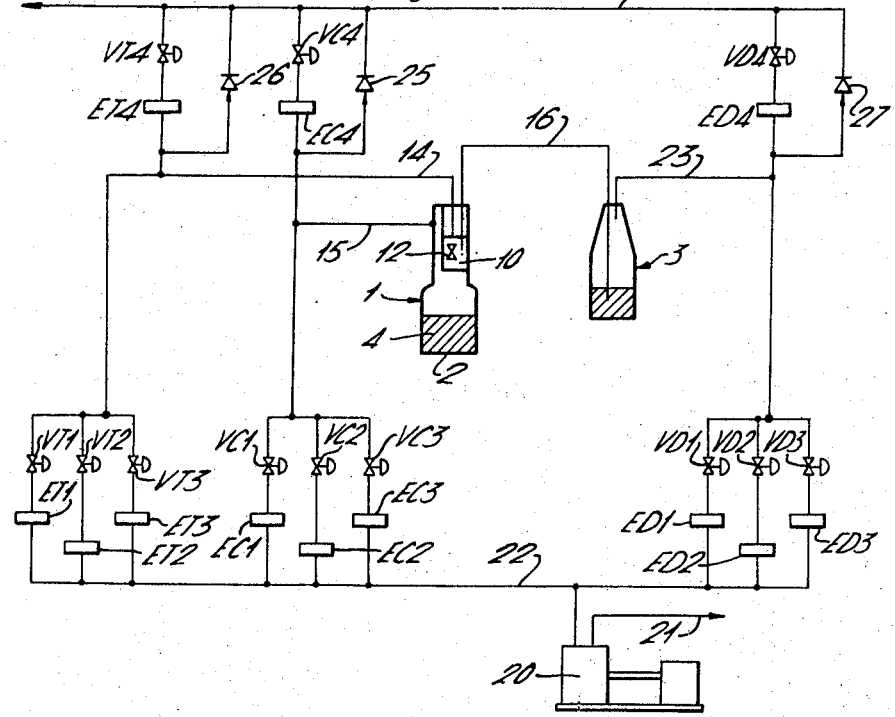
FIGURE 2 shows a part of the cryopump control system diagrammatically.

Referring first to FIGURES 1 and 2 of the drawings, the cryopump to be described is for use in maintaining the gas pressure in a system at a desired low value. The cryopump would normally be used after an ordinary vacuum pump had reduced the pressure in the system to about $10^{-3}$ millimetres of mercury. The cryopump includes a vessel 1 having a metal surface 2 which is arranged to project into the system to be pumped. The vessel 1 contains liquid helium which is replenished as necessary from a Dewar 3.

The surface 2 is of the order of 60 square centimetres in area and is in direct contact and hence in good thermal contact with the liquid helium in the vessel 1. Gas molecules striking the surface 2 lose a part of their incident energy and it is arranged that the surface 2 is maintained at a temperature sufficiently below the normal boiling point of the gas in the system for gas phase molecules to be removed from the system by condensation on the surface 2. For effective pumping the incident molecules must have a high sticking coefficient, that is to say there must be a high probability that a gas molecule striking the surface 2 will condense, and the rate of evaporation from the surface 2 must be lower than the rate of condensation.

The particular embodiment of the cryopump being described is for use in association with experiments relating to plasma physics and controlled thermonuclear reactions and the gas to be pumped from the system is primarily hydrogen. In this case it is preferable that the surface 2 and hence the liquid helium in the vessel 1, should be maintained at some temperature in the range 3.1° K. to 3.9° K. to within ±0.05° K., in order that the required system pressure be maintained and at the same time the cryopump should be operating efficiently. The liquid helium in the vessel 1 is maintained at a temperature below the normal boiling point of liquid helium by continuously pumping helium gas from the vessel 1, so that the pressure is maintained in the range of 210 to 580 millimetres of mercury, which corresponds to liquid helium temperatures in the range 3.1° K. to 3.9° K.

The cryopump therefore includes provision for accurately maintaining the temperature of the liquid helium in the vessel 1 at the desired value, for replenishing the liquid helium in the vessel 1 when necessary, and for ensuring that there is no appreciable fluctuation from the desired temperature during replenishment. The cryopump also includes various other arrangements for control, safety and for providing indications.

The various parts of the cryopump will now be described in more detail.

First the vessel 1 will be described in more detail with particular reference to FIGURE 1. The surface 2 is at the bottom of a wide portion of the vessel 1, hereinafter referred to as the condenser 4, from which extends a support tube 5 of low thermal conductivity, which passes out through a wall of the system to be pumped by way of a mounting flange 6. Surrounding the condenser 4 is a radiation shield 7 which is an extension of a double-walled jacket 8 surrounding the lower part of the support tube 5. The jacket 8 is partly filled with liquid nitrogen which is replenished periodically by way of a tube 9 which extends through the flange 6. The jacket 8 may advantageously be extended to join the support tube 5 near the flange 6, so as to intercept conducted heat flow in the support tube 5 from that part of it which is beyond the flange 6 and is so at approximately room temperature.

Mounted within the lower part of the support tube 5 is a subsidiary vessel hereinafter referred to as the transfer box 10. The bottom of the transfer box 10 has an outlet 11 which can be closed by a transfer valve 12 controlled from outside the vessel 1 by an operating rod 13. When the outlet 11 is closed by the transfer valve 12, helium gas can be pumped from the transfer box 10 by way of an outlet tube 14, but the transfer valve 12 closes the outlet tube 14 when the outlet 11 is opened. Helium gas is continuously pumped from the condenser 4 by way of an outlet tube 15. Liquid helium can be admitted to the transfer box 10 by way of a vacuum-insulated transfer tube 16 connected to the Dewar 3.

Projecting into the vessel 1 are three vapour pressure thermometers $T_1$, $T_2$ and $T_3$. The bulb of the thermometer $T_3$ is in the transfer box 10, and the bulbs of the thermometers $T_1$ and $T_2$ are in the condenser 4. The bulb of the thermometer $T_2$ is comparatively near the bottom of the condenser 4 and defines the level of liquid helium at which replenishment is necessary, and the bulb of the thermometer $T_1$ is comparatively near the top of the condenser 4 and defines the level of liquid helium at which replenishment ceases.

Each of the thermometers $T_1$, $T_2$ and $T_3$ is arranged to supply an output electric signal when the temperature, $t_1$, $t_2$ or $t_3$, respectively, of the bulb rises above a preset temperature, $t_1'$, $t_2'$, $t_3'$ respectively, these preset temperatures corresponding to immersion in liquid helium. In other words, each of the thermometers $T_1$, $T_2$ and $T_3$ supplies an electric signal when the bulb is in helium gas and hence $t_1 > t_1'$ or $t_2 > t_2'$ or $t_3 > t_3'$.

Referring now to FIGURE 2 this shows, in very diagrammatic form, the vessel 1, the Dewar 3 and the associated pumping arangements. The required pumping is provided continuously by a vapour-pumping rotary pump 20 which expels helium gas by way of an outlet 21 to a recovery system (not shown). A low pressure is thus maintained on a common vacuum line 22.

The outlet tube 15 from the condenser 4 can be connected to the vacuum line 22 by way of normally closed needle valves VC1, VC2 and VC3. To decrease the pressure in the condenser 4 valves VC1, VC2 and VC3 can be opened by energising electromagnetic relays EC1, EC2 and EC3 respectively. The valves VC1, VC2 and VC3 have orifices of progressively decreasing sizes, so that the pressure in the condenser 4 can be controlled by the sequential energisation of the appropriate relays EC1, EC2 and EC3.

The outlet tube 14 from the transfer box 10 can be connected to the vacuum line 22 by way of normally closed needle valves VT1, VT2 and VT3. To decrease the pressure in the transfer box 10 valves VT1, VT2 and VT3 can be opened by energising electromagnetic relays ET1, ET2 and ET3 respectively. The valves VT1, VT2 and VT3 have orifices of progressively decreasing sizes, so that the pressure in the transfer box 10 can be controlled by the sequential energisation of the appropriate relays ET1, ET2 and ET3.

There is also an outlet tube 23 from the Dewar 3 which can be connected to the vacuum line 22 by way of normally closed needle valves VD1, VD2 and VD3. To decrease the pressure in the Dewar 3, valves VD1, VD2 and VD3 can be opened by energising electromagnetic relays ED1, ED2 and ED3 respectively. The valves VD1, VD2 and VD3 have orifices of progressively decreasing sizes, so that the pressure in the Dewar 3 can be controlled by the sequential energisation of the appropriate relays ED1, ED2 and ED3.

The outlet tube 15 from the condenser 4 can also be connected to a storage line 24 by energising an electromagnetic relay EC4 which opens a normally closed valve VC4. The valve VC4 is also bypassed by a non-return valve 25 for safety purposes.

The outlet tube 14 from the transfer box 10 can be connected to the storage line 24 by energising an electromagnetic relay ET4 which opens a normally closed valve VT4. The valve VT4 is also bypassed by a non-return valve 26 for safety purposes.

The outlet tube 23 from the Dewar 3 can also be connected to the storage line 24 by energising an electromagnetic relay ED4 which opens a normally closed valve VD4. The valve VD4 is also bypassed by a non-return valve 27 for safety purposes.

The storage line 24 is connected to a helium storage bag (not shown). This enables operation of the cryopump to be stopped without necessarily opening it to the atmosphere. It is desirable to have this feature otherwise it is necessary to flush the cryopump with dry helium gas before starting operation, as if this is not done ice is likely to form in the cryopump and may interfere with the operation, for example by jamming the transfer valve 12.

The pressure in the condenser 4 is normally such that the liquid helium in the condenser 4 is at the temperature at which it is desired to maintain the surface 2, whilst the pressure in both the transfer box 10 and the Dewar 3 is approximately 1 to 2 centimetres of mercury higher corresponding to a temperature some 0.03° K. higher.

Figure 3:
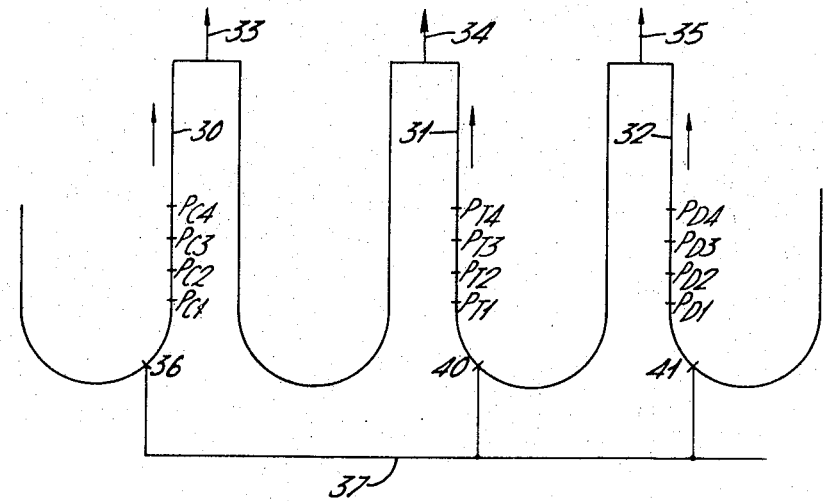
FIGURE 3 shows another part of the cryopump control system diagrammatically.

Reference will now be made to FIGURE 3 of the drawings which shows, very diagrammatically, the pressure measuring system. Basically this comprises a series of interconnected mercury manometers, three arms 30, 31 and 32 of which are used to obtain pressure indications from the condenser 4, transfer box 10 and Dewar 3, respectively, shown in FIGURES 1 and 2. There are therefore connections 33, 34 and 35 from the tops of the arms 30, 31 and 32 to the condenser 4, transfer box 10 and Dewar 3, respectively. The arrows alongside the arms 30, 31 and 32 indicate the direction in which the mercury moves in the arm 30, 31 or 32 as the pressure in the condenser 4, transfer box 10 or Dewar 3 respectively decreases.

Near the bottom of the arm 30 is in electrical contact 36 projecting into the mercury, the contact 36 also being connected to a common line 37. At successively higher points in the arm 30 are four further electric contacts projecting into the arm 30, these contacts being for convenience referenced $P_{C1}$, $P_{C2}$, $P_{C3}$ and $P_{C4}$ because they correspond to the position of the top of the mercury for four successively lower values $P_{C1}$, $P_{C2}$, $P_{C3}$ and $P_{C4}$ of the instantaneous pressure $P_C$ in the condenser 4 (FIGURES 1 and 2). The arrangement is such that an electric signal is supplied to a logic circuit to be described subsequently for each of the contacts $P_{C1}$, etc., which is uncovered. If for example the condition is $$P_{C4} < P_{C3} < P_C < P_{C2} < P_{C1}$$

that is to say if the top of the mercury is between contacts $P_{C3}$ and $P_{C2}$, then two electric signals will be supplied to the logic circuit, these corresponding to $P_C > P_{C3}$ and $P_C > P_{C4}$.

The actual arrangement of the contacts $P_{C1}$, etc., is shown in more detail in FIGURE 4 of the drawings, to which reference is now made. Mounted within the arm 30 is a stainless steel tube 38 which at its lower end carries the contacts $P_{C1}$, etc., each projecting beyond the preceding one. Connections to the contacts $P_{C1}$, etc., are by way of leads 39.

Referring again to FIGURE 3, near the bottom of the arm 31 is an electrical contact 40 projecting into the mercury, the contact 40 also being connected to the common line 37. At successively higher points in the arm 31 are four further electrical contacts projecting into the arm 31, these contacts being for convenience referenced $P_{T1}$, $P_{T2}$, $P_{T3}$ and $P_{T4}$ because they correspond to the position of the top of the mercury for four successively lower values $P_{T1}$, $P_{T2}$, $P_{T3}$ and $P_{T4}$ of the instantaneous pressure $P_T$ in the transfer box 10 (FIGURES 1 and 2). The arrangement and operation of the contacts $P_{T1}$, etc. is similar to that of the contacts $P_{C1}$, etc.

Near the bottom of the arm 32 is an electrical contact 41 projecting into the mercury, the contact 41 also being connected to the common line 37. At successively higher points in the arm 32 are four further electrical contacts projecting into the arm 32, these contacts being for convenience references $P_{D1}$, $P_{D2}$, $P_{D3}$ and $P_{D4}$ because they correspond to the position of the top of the mercury for four successively lower values $P_{D1}$, $P_{D2}$, $P_{D3}$ and $P_{D4}$ of the instantaneous pressure $P_D$ in the Dewar 3 (FIGURES 1 and 2). The arrangement and operation of the contacts $P_{D1}$, etc. is similar to that of the contacts $P_{C1}$, etc.

The contacts $P_{C1}$, etc., and $P_{D1}$, etc., are movable so that the temperatures in the condenser 4 and Dewar 3 (FIGURES 1 and 2) may be readily set at any desired value in the range 3.1° K. to 3.9° K. The contacts $P_{T1}$, etc. are fixed. The contact $P_{T1}$ is set just below the equi-pressure mercury level, and contact $P_{T2}$ is set just above this level, so that the valve VT1 is operated (in a way which will become clear subsequently) to maintain the transfer box 10 at the same pressure as the Dewar 3 (FIGURES 1 and 2). The contacts $P_{T3}$ and $P_{T4}$ are set about 1½ centimetres higher to achieve the pressure differential between the transfer box 10 and Dewar 3 (FIGURES 1 and 2) required for transfer of liquid helium.

The overall operation of the cryopump is controlled by the logic circuit shown in FIGURE 5 of the drawings, to which reference is now made. Some of the symbols used in FIGURE 5 will first be explained.

The conventional symbols are used for OR gates, AND gates and NOT gates.

The circuit includes a number of switches which are closed when a certain operation is to be performed. Each such switch is represented by a double lined rectangle enclosing a brief description of the relevant operation.

Certain conditions sensed by the thermometers and manometers previously referred to result in electric signals being supplied. Each such signal source is represented by a rectangle enclosing an indication of the condition which results in a signal being supplied, for example, $P_C > P_{C4}$.

The fulfilment of certain conditions is indicated by lamps. Each such lamp is represented by a rectangle with curved ends enclosing a brief description of the relevant condition.

On the fulfilment of certain conditions one or other of the electromagnetic relays ET1, etc., (FIGURE 2) is energised. This is represented by squares enclosing relay references, and the operation is such that when a signal is supplied to the input to a relay, that relay is energised and the associated valve is opened.

On the fulfilment of certain other conditions the transfer valve 12 (FIGURE 1) changes position, and instead of closing the outlet 11 it closes the outlet tube 14. This occurs when a signal is supplied to the rectangle designated transfer valve.

The operation of the logic circuit will not be described exhaustively, but some parts of the operation will be described and from this the remainder of the operation can readily be deduced. In this description reference will also be made to FIGURES 1, 2 and 3.

The part of the operation which controls the pressure in the condenser 4 and hence the temperature of the liquid helium in the condenser 4 will first be considered. As stated above, the manometer serves to compare the instantaneous pressure $P_C$ in the condenser 4 with preset pressure values $P_{C1}$, $P_{C2}$, etc. in sequence of reducing pressure. At any time when $P_C > P_{C1}$ each of the AND gates 51, 52 and 53 is supplying an output signal, so that the relays EC1, EC2 and EC3 are energised and the valves VC1, VC2 and VC3 are all open. The pressure in the condenser 4 is therefore reduced at the maximum pumping speed until $P_C < P_{C2}$ whereupon one of the input signals to the AND gate 53 ceases, the relay EC1 is de-energised, and the valve VC1 closes reducing the pumping speed.

Similarly the other valves VC2, etc. close as the pressure is further reduced until the pumping speed approximates to the rate of evaporation of helium from the condenser 4.

If the pumping speed is now too low the pressure in the condenser 4 will rise until the mercury in the arm 30 falls past the next lowest contact and the associated valve is opened to increase the pumping speed. If the pumping speed is now too high the pressure in the condenser 4 will fall until the mercury in the arm 30 rises past the next highest contact and the associated valve is closed to decrease the pumping speed. This arrangement results in little chattering of the relays and valves.

The valves VC1, VC2 and VC3 are adjusted so that the system normally operates with the pressure $P_C$ in the condenser 4 between $P_{C2}$ and $P_{C3}$.

The part of the operation which controls the pressure in the Dewar 3 and hence the temperature of the liquid helium in the Dewar 3 is similar, with the exception that when $P_D < P_{D4}$, the valve VD4 is opened to allow helium gas to enter the Dewar 3, so that the correct pressure can be maintained during transfer.

The part of the operation which controls the transfer of liquid helium automatically from the Dewar 3 to the condenser 4 will now be described.

First it is assumed that the condenser 4 is full, so that the bulbs of thermometers T1 and T2 are both immersed in liquid helium. This means that there is no input signal to the AND gate 54 and that the condenser full lamp 55 is lit. When the level of the liquid helium has fallen to the extent that the bulbs of both thermometers T1 and T2 are uncovered, then signals corresponding to $t_1 > t_1'$ and $t_2 > t_2'$ are supplied to the AND gate 54 which supplies a signal to the AND gate 56. Also the condenser full lamp 55 is extinguished and the condenser empty lamp 57 is lit.

The AND gate 56 should now supply an output signal because the conditions should normally be such that signals are already being supplied over all the other inputs. These conditions are as follows.

The condenser pressure should be right, that is to say $P_C < P_{C1}$, so that the condenser pressure right lamp 58 is lit and a signal supplied to the AND gate 56.

The Dewar pressure should be right, that is to say $P_D < P_{D1}$, so that the Dewar pressure right lamp 59 is lit and a signal supplied to the AND gate 56.

The system pressure should be right. Clearly there is no point in maintaining the surface 2 cold if the pressure in the system being pumped is so high that no useful cryopumping can occur. The system pressure $P_S$ is therefore monitored and so long as it is below some predetermined value $P_S'$, the system pressure right lamp 60 is lit, and a signal supplied to the AND gate 56.

The radiation shield 7 should be cold, in other words there should be liquid nitrogen in the jacket 8. So long as this is the case the temperature $t_R$ of the radiation shield 7 is belowe some predetermined value $t_R'$, the radiation shield cold lamp 61 is lit, and a signal is supplied to the AND gate 56.

Lastly the Dewar 3 should contain liquid helium. This is indicated by a further vapour pressure thermometer T4. So long as the bulb of this thermometer T4 is immersed, so that $t_4 < t_4'$, the Dewar empty lamp 62 is extinguished, and a signal is supplied to the AND gate 56.

The AND gate 56 will therefore supply a signal to the OR gate 63, which will supply a signal to the AND gate 64. The condenser system start switch 50 and the helium supply system start switch 65 must be closed, so assuming the hold transfer switch 66 has not been closed, the AND gate 64 supplies a signal to the AND gate 67, and to the AND gates 68 and 69. This causes the valves VT2 and VT3 to be opened increasing the pumping speed in the transfer box 10, and so reducing the pressure in the transfer box 10 below that of the Dewar 3. This results in liquid helium siphoning from the Dewar 3 by way of the transfer tube 16 into the transfer box 10. The transfer valve 12 is at this time closing the outlet 11.

At first the helium entering the transfer box 10 will be in the form of gas and pumping of the transfer box 10 will therefore continue until there is liquid helium in the transfer box 10. The pressure $P_T$ in the transfer box 10 will then fall until when $P_T < P_{T3}$, a signal is supplied to the AND gate 67, and the transfer condition lamp 70 is lit. When the bulb of the thermometer $T_3$ is immersed in liquid helium, $t_3 < t_3'$, a signal is supplied to the AND gate 67 and the helium in transfer box lamp 71 is lit.

The AND gate 67 then supplies a signal to the OR gate 72 which supplies a signal to the transfer valve operating relay 73 which causes the transfer valve 12 to lift off the outlet 11 and close the outlet tube 14, so that liquid helium is transferred to the condenser 4. The transfer proceeding lamp 74 is also lit.

When the condenser 4 is full, that is when the bulb of the thermometer T1 is immersed in liquid helium, $t_1 < t_1'$, so there is no longer an output signal from the AND gate 54. This causes valves $VT_2$ and $VT_3$ to be closed so that the pressure in the transfer box 10 rises to that of the Dewar 3. This means that $P_T > P_{T3}$, the transfer valve 12 closes the outlet 11 and the transfer is terminated.

In a particular embodiment of the cryopump described it has been found that during the replenishment of the condenser 4 the temperature of the liquid helium in the condenser 4 does not vary from the desired temperature by more than $\pm 0.02°$ K.

If the condenser 4 is completely empty, as when starting up, the system will in fact operate automatically to fill it with liquid helium and bring it to the desired temperature. It is however more economical of liquid helium to use the manual transfer request switch 75 and manual transfer proceed switch 76 which bypass many of the normal conditions and enable helium gas from the Dewar 3 to be pumped through the transfer box 10 and condenser 4 to precool them.

Although a cryopump has been described, it will be appreciated that the arrangement can equally well be used where the condenser 4 does not form part of a cryopump but is part of some other cryogenic device which needs to be kept at a predetermined temperature and to be replenished without causing this temperature to vary appreciably.

I claim:

1. A cryopump comprising a surface arranged to be in contact with the gas within a system to be pumped, a first vessel arranged to contain a cryogenic liquid in good thermal contact with said surface so that the surface is maintained substantially at the temperature of the cryogenic liquid, this temperature being such that there is a net condensation of gas phase molecules from the system on to said surface, means to maintain the cryogenic liquid in the first vessel substantially at a desired temperature, a subsidiary vessel communicating directly with the first vessel, a connection through which cryogenic liquid is arranged to be supplied from a second vessel containing a further quantity of the same cryogenic liquid to said subsidiary vessel when the cryogenic liquid in the first vessel needs replenishing, and means to allow cryogenic liquid to pass from said subsidiary vessel into the first vessel only when the temperature of the cryogenic liquid in said subsidiary vessel is substantially equal to said desired temperature.

2. A cryopump in accordance with claim 1 wherein said means to maintain the cryogenic liquid in the first vessel substantially at a desired temperature comprises a pumping arrangement which operates to maintain the pressure in the first vessel substantially at a predetermined value.

3. A cryopump in accordance with claim 2 wherein said means to allow cryogenic liquid to pass from said subsidiary vessel into the first vessel comprises an outlet from said subsidiary vessel into the first vessel, a valve which normally closes said outlet, means to sense when the cryogenic liquid in the first vessel falls below a first predetermined level and when this occurs to cause said pumping arrangement to reduce the pressure in said subsidiary vessel so that cryogenic fluid passes through said connection from the second vessel to said subsidiary vessel, the cryogenic fluid normally being gaseous initially but becoming liquid as pumping proceeds, means to sense when the cryogenic liquid in said subsidiary vessel rises above a predetermined level, means thereupon to open said valve so that cryogenic liquid passes from said subsidiary vessel into the first vessel, means to sense when the cryogenic liquid in the first vessel rises above a second predetermined level higher than the first predetermined level, and means thereupon to stop the replenishment.

4. A cryopump in accordance with claim 3 wherein the cryogenic liquid is liquid helium.

5. A cryopump in accordance with claim 4 wherein the gas within said system to be pumped is predominantly hydrogen and wherein said pumping arrangement which maintains the liquid helium in the first vessel substantially at a desired temperature operates to maintain the pressure in the first vessel substantially at a predetermined value lying within the range 210 to 580 millimetres of mercury.

6. A cryogenic device comprising a first vessel arranged to contain a cryogenic liquid, a pumping arrangement which operates to maintain the pressure in the first vessel substantially at a predetermined value so that the cryogenic liquid in the first vessel is maintained substantially at a desired temperature, a subsidiary vessel communicating directly with the first vessel, a connection through which cryogenic liquid is arranged to be supplied from a second vessel containing a further quantity of the same cryogenic liquid to said subsidiary vessel when the cryogenic liquid in the first vessel needs replenishing, and means to allow cryogenic liquid to pass from said subsidiary vessel into the first vessel only when the temperature of the cryogenic liquid in said subsidiary vessel is substantially equal to said desired temperature, said means comprising an outlet from said subsidiary vessel into the first vessel, a valve which normally closes said outlet, means to sense when the cryogenic liquid in the first vessel falls below a first predetermined level and when this occurs to cause said pumping arrangement to reduce the pressure in said subsidiary vessel so that cryogenic fluid passes through said connection from the second vessel to said subsidiary vessel, the cryogenic fluid normally being gaseous initially but becoming liquid as pumping proceeds, means to sense when the cryogenic liquid in said subsidiary vessel rises above a predetermined level, means thereupon to open said valve so that cryogenic liquid passes from said subsidiary vessel into the first vessel, means to sense when the cryogenic liquid in the first vessel rises above a predetermined level, and means thereupon for stopping the replenishment.

7. A cryogenic device in accordance with claim 6 wherein the cryogenic liquid is liquid helium.

References Cited
UNITED STATES PATENTS

| | | | |
|---|---|---|---|
| 2,756,765 | 7/1956 | Agule et al. | 62—55 X |
| 2,964,918 | 12/1960 | Hansen et al. | 62—55 X |
| 2,966,039 | 12/1960 | Williamson | 62—55 X |
| 3,106,071 | 10/1963 | Green et al. | 62—55 |
| 3,195,620 | 7/1965 | Steinhardt | 62—514 |

LLOYD L. KING, *Primary Examiner.*